Jan. 10, 1967 A. H. REEVES ETAL 3,298,016

CODING EQUIPMENT

Filed Jan. 17, 1964 3 Sheets-Sheet 1

Inventor
Alec H. Reeves
Donald R. Barber
By
[signature]
Attorney

CODING EQUIPMENT

Filed Jan. 17, 1964 3 Sheets-Sheet 2

Inventor
Alec H. Reeves
Donald R. Barber
By
[signature] Attorney

CODING EQUIPMENT

Filed Jan. 17, 1964 3 Sheets-Sheet 3

Inventor
Alec H. Reeves
Donald R Barber
By
Percy P. Lantzy Attorney

3,298,016
CODING EQUIPMENT

Alec Harley Reeves and Donald Robert Barber, London, England, assignors to International Standard Electric Corporation, New York, N.Y., a corporation of Delaware Filed Jan. 17, 1964, Ser. No. 338,410
Claims priority, application Great Britain, Jan. 25, 1963, 3,250/63
12 Claims. (Cl. 340—347)

This invention relates to coding equipment, especially, but not exclusively, for use in pulse code modulation (hereinafter called P.C.M.) systems of communication.

According to the invention there is provided coding equipment which provides a code combination having $x$ digits, where $x$ is less than $n$, which $x$-digit code combination represents a value which can be expressed by a selected group of $m$ digits in an $n$-digit code combination.

According to the invention there is also provided coding equipment for producing a binary digit code combination representative of the value of an analog quantity, which binary code combination is in two parts, in which one of said two parts is a plural-digit binary code combination which specifies the denominational significance of the other part, and in which said other part is a plural-digit binary code combination representative of the $m$-most significant binary digits of an $n$ digit binary code combination corresponding to the value of the analog quantity.

According to the invention said analog quantity is an intelligence sample in a P.C.M. communication system.

Embodiments of the invention will now be described with reference to the accompanying drawings, in which.

Figure 1:
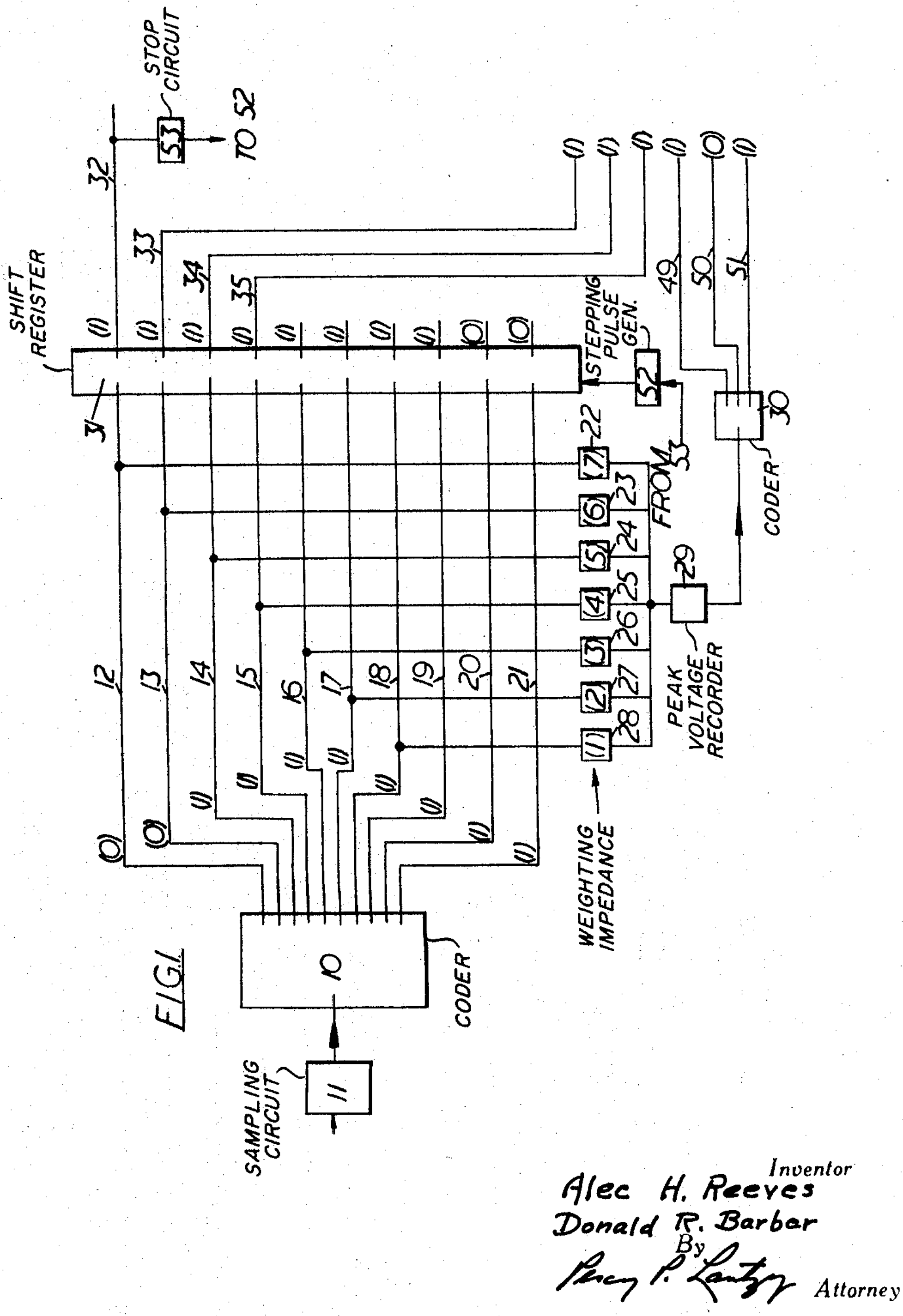
FIG. 1 is a block diagram of a P.C.M. coder embodying the present invention.

Before describing the coders, their basic principles will be described. The coders described below are based on the use of a code having a relatively small number of digits, this being possible at the cost of some error. An example in which some error can be tolerated is where a measuring instrument can measure a quantity to six digit accuracy and only four-digit accuracy is needed. In such a case the result of each measurement can be simplified by taking only the four most significant digits. This simplification is effected at the cost of some error, the size of which varies with the amplitude of the measured quantity.

As an example, if binary notation is used, with four significant digits only, the degree of error varies from 12½% to 6¼%. Thus, if the analog quantity has a value 10000, i.e. level (or amplitude) 16, this would be quoted, using four significant digits as 1000(0). The next higher value which can be conveyed, using four significant digits, is 1001 (which represents level or amplitude 18). The difference of two levels when expressed in four binary digits is equal to an error of 12½%. On the other hand the next lower level which can be conveyed, using four significant digits, is 1111, which represents level 15. The difference of one level when expressed in four binary digits is equivalent to an error of 6¼%.

Similarly in the case of level 32, which is represented, using four significant digits, as binary 1000, the next higher value which can be conveyed is 1001 and the next lower value which can be conveyed is 1111 representing levels 36 and 30, respectively. Here again, when these differences are considered in the context of the four most significant binary digits the error in the first instance is 12½% and in the second instance is 6¼%. When using four significant digits in this way to convey values originally in five significant digits it must be remembered that each four digit combination has to be multiplied by 2 to obtain its proper value, and where the four digits convey values originally in six significant digits the four digit combination has to be multiplied by four and so on.

To revert to decimal notation, where a large number is involved, e.g. 1,234,000, it is common to represent it as a simple decimal number less than 10, followed by a power of 10. Thus, the above number is represented as $$1.234\times10^6$$

The information is in two portions:

(a) a number giving the value within the decade. This, in the above example, is 1.234, and is analogous to the mantissa of a logarithm.

(b) a separate portion showing which decade the number is in. In the above example this is 6, i.e. this means that portion (a) must be regarded as multiplied by $10^6$. This portion is analogous to the characteristic of a logarithm.

In the above example, the number could be transmitted as 12346 (assuming that the power of 10 does not exceed 9), in which case the first four digits are interpreted as conveying portion (a) and the fifth digit as conveying portion (b).

The most important uses of this technique are P.C.M. coders using binary codes, where it allows a reduced number of digits to be sent. However, the technique can be used in binary coders other than those for use in P.C.M. systems, and also for non-binary, e.g. ternary, codes although the coders described are electronic, the technique is also usable where the coders use non-electronic, e.g. mechanical techniques.

To explain the technique, a coder is considered in which analog values to be handled that lie between 8 and 1023. The first step in dealing with an analog value is to convert that value, which is a speech wave sample in P.C.M. telephony, into a binary code combination using any convenient form of 10 digit coder. The maximum permissible error in the final code is assumed to be 12½%, which is the maximum error which occurs when one takes only the four most significant binary digits. The first digit of such a block of four digits must always be "1," so need not be sent. Consequently, the information which must be sent for portion (a), above, is a set of three binary digits. In extracting these sets of three digits from the code combinations the binary values are dealt with in octaves. Octave 1 is the analog range 8–15, expressed in 10-digit binary code as 0000001000 to 0000001111, octave 2 is the analog range 16–31, i.e. code combinations 0000010000 to 0000011111, and so on. When the numbers in octave 2 are dealt with on the basis of only 4 significant digits, the range is expressed as 000001000 to 000001111. This has the above-mentioned maximum error percentage of 12½%. Since the difference between adjacent code combinations is two units, this range is said to have a quantum jump of 2.

The code group which gives the four most significant digits, and which corresponds to portion (a) above, is known as the octave position group, and (as already mentioned) can be given as a three digit combination. This, as mentioned above, is because the first of the four most significant digits is always "1", and so need not be sent. Thus, the octave portion is sent as a group of three binary digits to which a digit is added at the higher value end on reception.

The information corresponding to portion (b) above, known as the octave number, gives the location within the 10 digit code combination of its least significant digit, and therefore of the block of four most significant digits. As the lowest analog value is assumed to be 8, there are only seven possible values for the octave number. The octave number, being seven or less, is expressed as a 3-digit binary code combination.

Continuing the logarithm analogy mentioned above the octave position is analogous to the mantissa and the octave number to the characteristic of the logarithm.

To signal the binary code combination for a signal sample, the three digits which form the octave position are added to the three digits of the octave number to form a 6 digit code combination. Thus, a reduction in the number of digits to be sent from 10 to 6 is obtained with consequent economy, as nearly half the bandwidth is saved. The output can be on 6 separate channels, or serial, using a single channel, or a serial-parallel arrangement could be used.

In some cases it may be necessary to be able to handle the values from 0 to 7, referred to herein as octave 0. The numbers in this range have quantum jump 1, and the octave number code is, of course 000.

The figures for the complete range of a 10 digit coder are given in Table 1, but to facilitate the explanation one example will be considered. For the analog value 255, the 10 digit code combination is 0011111111. The octave position group in full (i.e. all four digits) is 1111, but as the first is not sent the octave position group as sent is 111, and the octave number is also sent which gives the location of the most significant digit. The number for this digit is actually 3 less than the actual position of that digit. Consequently, as the four most significant digits are used, this group represents the position of the least significant digit of the four most significant digits. Thus, in the example given the code combination sent is 111–101 or 101–111 where the information is sent serially, depending on which portion is sent first.

It is assumed that for a "1" digit a positive voltage is produced on an output wire from the code, a "0" digit being represented by zero (i.e. earth) voltage.

The seven wires 12 to 18, which convey the seven most significant digits are connected via weighting impedances 22 to 28, inclusive, to peak voltage recorder 29. These elements 22–29 will be described later in more detail with reference to FIG. 2. The weighting impedances connected to the respective wires 12–18 are such that a voltage appears at the input to recorder 29 which, in effect, "tells" the latter which is the most significant digit wire at present. That is, it enables recorder 29 to locate the most significant digit wire. For this purpose, the characteristics of the impedance elements are such that a "1" digit on wire 12 produces 7 units of voltage input to the device 29, a "1" on wire 13 produces 6 units input to device 29, a "1" on wire 14 produces 5 units, and so on. Recorder 29 has its output connected to coder 30, which produces a three digit code which identifies the wire on which the highest voltage occurs. This indicates the octave number, i.e. the number of the digital place in which occurs the last digit of the block of four most significant digits used.

Wires 12–21 are also connected to shift register 31 in which the 10 digit combination from coder 10 is registered and in which it is shifted until a "1" digit occurs at its uppermost output wire 32. When this occurs, shifting stops and the next three digits in the shift register are read out on wires 33–35 to form the octave position group. This is, the first "1" is ignored (as mentioned above it is not necessary for it to be sent) and the next three digits, each of which can be "0" or "1," are sent out.

The example of analog level 255 already mentioned will be considered again. In this case the coder produces the output code combination already quoted, represented by "0" digits on wires 12 and 13 and "1" digits on the other wires, as indicated in brackets in FIG. 1. With the code pattern given in FIG. 1 there is no input to device

TABLE 1

| Octave No. | Original Coder Pattern | Coder pattern to 4 significant digits | Input Analog Level | Output Analog Level | Position of largest digit | Octave No. Coded Output | Octave position Coded Output |
|---|---|---|---|---|---|---|---|
| 0 | 0000000000 to 0000000111 | 000 to 111 | 0 to 7 | 0 to 7 | 1 to 3 | 000 000 | 000 to 111 |
| 1 | 0000001000 to 0000001111 | 1000 to 1111 | 8 to 15 | 8 to 15 | 4 | 001 | 000 to 111 |
| 2 | 0000010000 to 0000011111 | 1000 to 1111 | 16 to 31 | 16 to 30 | 5 | 010 | 000 to 111 |
| 3 | 0000100000 to 0000111111 | 1000 to 1111 | 32 to 63 | 32 to 60 | 6 | 011 | 000 to 111 |
| 4 | 0001000000 to 0001111111 | 1000 to 1111 | 64 to 127 | 64 to 120 | 7 | 100 | 000 to 111 |
| 5 | 0010000000 to 0011111111 | 1000 to 1111 | 128 to 255 | 128 to 240 | 8 | 101 | 000 to 111 |
| 6 | 0100000000 to 0111111111 | 1000 to 1111 | 256 to 511 | 256 to 480 | 9 | 110 | 000 to 111 |
| 7 | 1000000000 to 1111111111 | 1000 to 1111 | 512 to 1023 | 512 to 960 | 10 | 111 | 000 to 111 |

In the block diagram forming FIG. 1, binary coder 10, which can be of well-known type, receives an analog input which, in the case of a P.C.M. coder comes from speech sampling circuit 11 whose input is the speech waveform to be signalled. This coder 10 produces a 10 digit code combination for each sample dealt with, the output being detained on ten output wires 12–21, inclusive. If the coder is a serial coder it would incorporate serial-parallel conversion, the sequentially generated pulse outputs being stored as they are produced. In this case, wires 12–21 would be the ten outputs from a temporary store.

Figure 2:
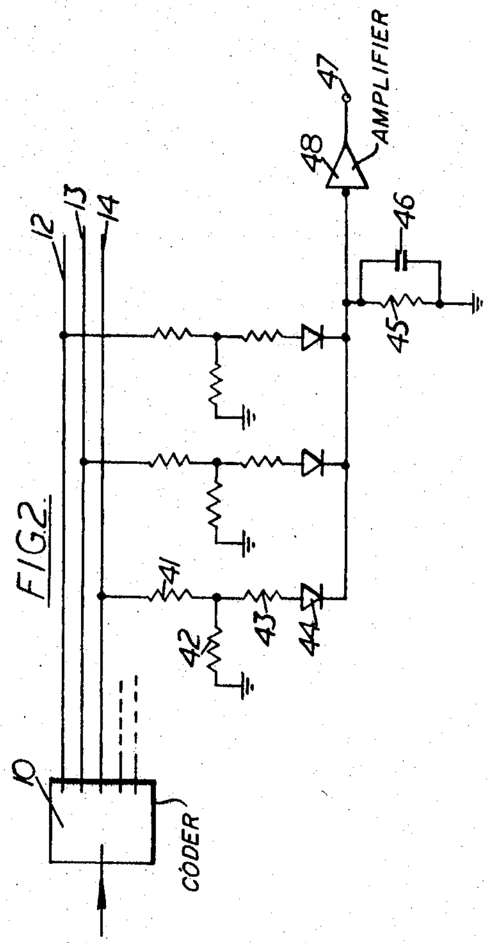
FIG. 2 is the circuit of a peak voltage recording device used in the coder of FIG. 1.

29 from wires 12 and 13, five units from wire 14, four from wire 15, three from wire 16, two from wire 17 and one from wire 18. Device 29, in effect, determines which of wires 12 to 19 which are energized is the most significant, and one circuit for achieving this is shown in FIG. 2.

In this arrangement, each of elements 22–28 consists of three resistors or impedances 41, 42 and 43, which are suitably proportioned for the wires to which they are connected. Thus, 41 and 42 in effect act as a potential divider, and the various potential dividers apply different proportions of the energization on the coder output wires via resistor 43 to a common point. All of these three impedance elements are connected to the common point via respective decoupling diodes, such as 44, and the common point is grounded via a parallel combination of resistor 45 and capacitor 46. With this arrangement capacitor 46 charges to a level which is proportional to the highest voltage which is applied to it via one of decoupling diodes 44. Consequently, its charge is representative of the most significant digit of the binary coded output of coder 10, FIG. 1. For clarity, coder 10 and wires 12, 13, 14 are indicated schematically in FIG. 2.

The common point of all the impedance elements and the parallel combination 45–46 is connected to output 47, via amplifier 48, if amplification is needed, as will usually be the case. This amplifier could conveniently be a transistor amplifier.

To return to FIG. 1, the voltage output from recorder 29, which represents the location of the most significant digit of the binary coded output of coder 10, is applied to a further binary coder 30.

This gives the octave position since, as mentioned above, octave position 1 has its most significant digit in the fourth element place. In the present case the octave position is 101, i.e. 5, which means that the number is in the fifth octave. Because of the "geometry" of the system the octave position in the present case specifies the location of the least significant digit of the octave number. With different numbers of digits this convenient fact may not apply, however. The output from coder 30 appears on three wires 49, 50 and 51, respectively, as indicated in brackets.

The generation of the octave position group to be sent with the octave number involves extracting the four most significant digits and deleting the first of these since, as already emphasized, it can only be a "1" digit. This uses shift register 31 into which, as already mentioned, the 10 digit code combination is written in parallel-fashion. In the arrangement described the shift register could conveniently be a magnetic shift register using square-loop core stages. The pattern stored in shift register 31 is then stepped "upwards" in the register (as shown in FIG. 1) by pulses from stepping pulse generator 52, which is started when coder 10 delivers its output, until a "1" digit reaches the end-most position, when output 32 therefrom is energized.

When output 32 is energized, stop circuit 53 connected thereto responds and applies a control to pulse generator 52 to stop the latter and, hence, to stop the stepping. It should be noted that if the output from coder 10 had included a "1" on wire 12, the immediate response of stop circuit 53 would have prevented pulse generator 52 from starting.

When the coder output has been so placed in register 31 that the most significant digit thereof is in the uppermost end position of the register, the three digits which represent the octave position group are present on the output wires 33, 34 and 35 of register, and when this condition exists the output from these wires and wires 49, 50 and 51 are simultaneously enabled.

This can be done by including in each of these six wires a normally closed gate which is opened when stop circuit 53 responds to "1" in the end-most position, or a predetermined short delay time thereafter.

As a result of the above operation the six digit code combination 111101 which corresponds to the 10 digit code combination for 255 is produced simply and economically. For a serial output, the six gates just mentioned would be connected to a common output, and would be opened one after the other in correct sequence.

Although the octave position digits are shown as being generated by a separate coder 30, it may in some cases be more economical for this to be done by the main coder 10 as a second operation, any three of its digital positions, e.g. the least significant three, being used.

Figure 3:
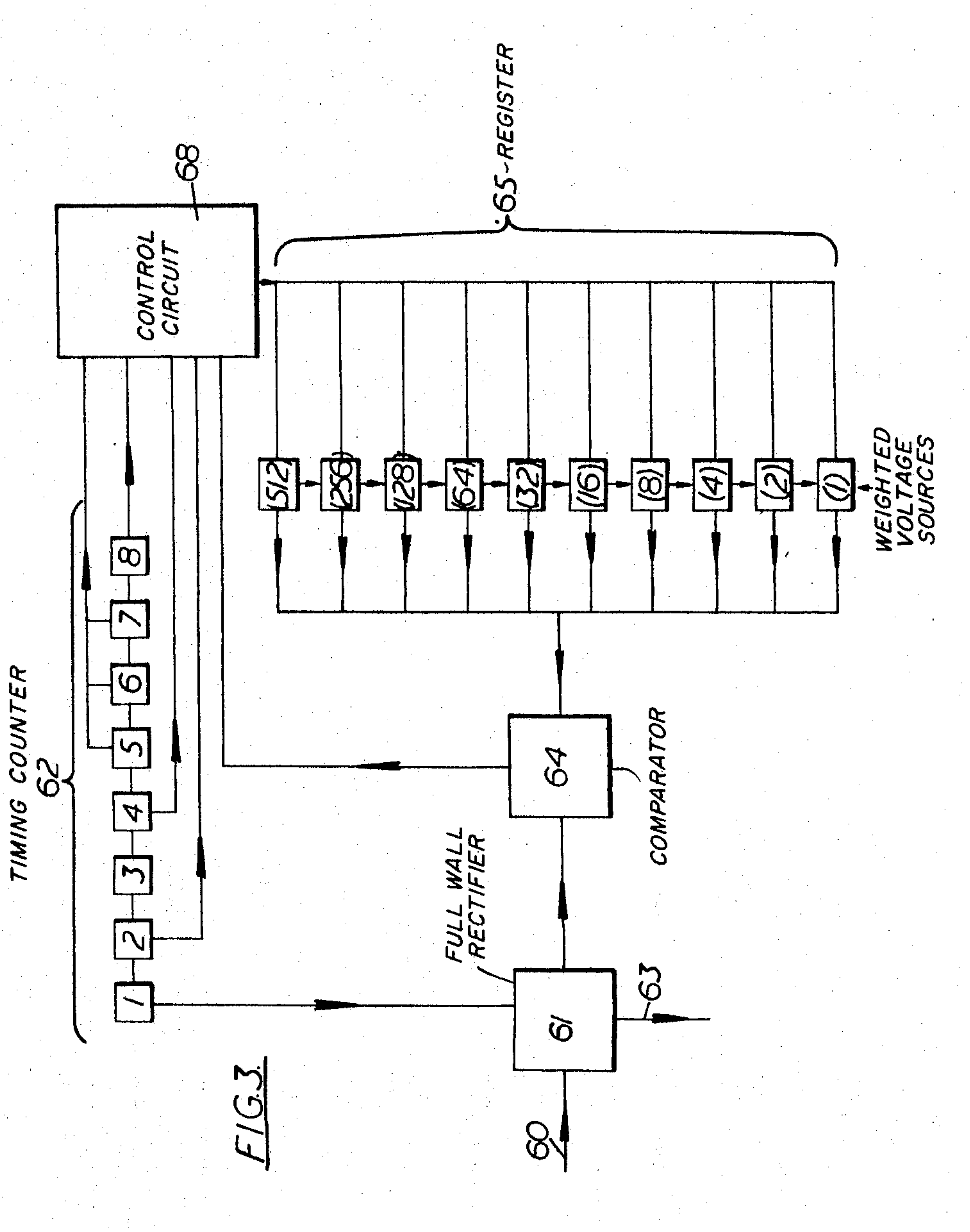
FIG. 3 is a block diagram of another P.C.M. coder embodying the present invention.

In the alternative form of coder for producing the required code shown in FIG. 3, the signal input 60 is in the form of a speech sample to be transmitted, in the case of a P.C.M. system, is applied to full wave rectifier circuit 61. A first timing pulse from timing counter 62 which controls the operation of the coder causes a signal to be produced on wire 63, which is indicative of the polarity of the signal sample, i.e. a "1" on wire 63 indicates a positive signal input at 60 and "0" indicates a negative signal input. This is used as required in the system. The rectified signal from rectifier 61 is passed to comparator network 64 which also receives weighted voltages from register 65. Register 65 has ten stages from which can be obtained the respective weighted output equivalent to analog values 512, 256, 128, 64, 32, 16, 8, 4, 2 and 1. During the stepping of timing counter 62 through its stages 2, 3 and 4, the various weighted outputs from register 65 are applied in turn to comparator network 64, starting with the highest value, i.e. 512. If the weighted output from register 65 is greater than the rectified signal from rectifier 61, comparator network 64 does not give an output, and the stepping of register 65 continues so that the next lower weighted output is applied to the comparator.

This process of successively trying the weights is continued either until a signal is derived from comparator network 64, indicating that the rectified signal has a greater value than one of the weighted outputs, or until register 65 has stepped through its first seven steps without a signal being produced from network 64. This signal is applied to control circuit 68 also controlled from counter 62. In the example previously discussed, where the signal value was 255, a signal would be produced by network 64 on the third step of register 65, i.e. when a weighted value of 128 was applied to the comparator. Thus, it has been determined that the signal value lies somewhere between 128 and 256. The result of the signal applied from comparator network 64 to control circuit 68 is to maintain the output from the third step of register 65 and to add to this in successive steps the outputs from the next three steps. The process which finds the most significant digital place of the P.C.M. code for the analog value is analogous to trial weighing with a pair of scales, starting with the heaviest weight and working down through the scale of weights until the most significant weight has been found. The next three weights (i.e. those following the first output from comparator 64) are stepped through on counts 5, 6 and 7 of timing counter 62.

When the most significant weight is determined by a positive signal from comparator network 64, a coding network (not shown) coupled to register 65 derives a 3-digit code which represents the position reached in stepping register 65. This is equivalent to the octave code derived by coder 30 in FIG. 1, and again it would be 101. That is, it would be three less than the position of the weight 128 from the "1" end of register 65.

When register 65 steps on after the signal from 64 to 68, the influence of control circuit 68 modifies the action of register 65 on comparator 64 in such a way that the next three weights are added to the highest effective weight, i.e. 128 in the example, and provided that the sum does not exceed the signal value they are retained and the positive signal again produced by network 64. In the example being described the weights supplied on all three steps below 128 are retained, since the sum of these three added to 128 does not exceed 255. Should the result of the addition of one weight exceed the signal value, then that weight is not retained due to the absence of an output from comparator 64. For each succeeding weight which is retained a positive digit "1" is derived to provide the equivalent of the octave position group. Thus, in the example given a code 111 is derived to indicate that the weights 64, 32 and 16 must be added to the weight 128 whose position has already been identified.

As in the coder described with reference to FIGS. 1 and 2, the two groups of three digits are combined to give the code combination to be sent. The polarity digit from 63 will normally be added and transmitted with the octave information.

If the signal value is less than 8, for example, it may be 7, then the register having stepped through its position for the first seven weights without any output from comparator 64 causes the associated coding equipment to generate a code 000, representing octave No 0. The remaining three weights are then stepped through in the normal manner to provide the octave position.

On the count of 8 by timing counter 62, register 65 is reset and the circuits are prepared for the next sample to be received on input 60.

It will be appreciated that the derivation and inclusion of the additional digit to denote the polarity of the sample, as described with reference to the second embodiment, can also be applied to the first embodiment if desired.

What we claim is:

1. Coding equipment comprising:

a source of an analog quantity whose value can be represented by an *n*-digit code combination;

first means coupled to said source responsive to said analog quantity to generate a first plural digit code combination consisting of given ones of the *m*-most significant digits of said *n*-digit code combination and a second plural digit code combination representing the location of said *m*-most significant digits in said *n*-digit code combination, where *m* is less than *n;* and second means coupled to said first means to provide said first and second plural digit code combinations as an *x*-digit code combination representative of the value of said analog quantity, where *x* is greater than *m* and less than *n*.

2. Equipment according to claim 1, wherein said given ones of said *m*-most significant digits consists of the *m*-1 least significant digits of said *m*-most significant digits.

3. Equipment according to claim 1, wherein said first and second code combinations each include *m*-1 digits.

4. Equipment according to claim 1, further including third means coupled to said source responsive to said analog quantity to generate a binary digit representative of the polarity of said analog quantity; and fourth means coupled to said third means to add said binary digit to said *x*-digit code combination to produce an *x*+1 digit code combination representative of the polarity and value of said analog quantity.

5. Equipment according to claim 1, wherein said first means includes third means coupled to said source to provide said given ones of said *m*-most significant digits to generate said first code combination;

fourth means coupled to said source to produce a signal indicating the position of said *m*-most significant digits in said *n*-digit code combination; and fifth means coupled to said fourth means to code said signal to generate said second code combination.

6. Equipment according to claim 1, wherein said first means includes an amplitude comparison means coupled to said source;

*n*-sources of voltage, the voltage of each of said *n*-sources having a different value related to the binary weighted value of a different one of the *n*-digits of said *n*-digit code combination;

means to sequentially couple said *n*-sources to said comparison means proceeding from the highest weighted voltage to the lowest weighted value;

said comparison means provide an output signal when the value of said analog quantity first exceeds one of voltage of one of said *n*-sources sequentially coupled thereto;

means coupled to said *n*-sources to generate said second code combination when said comparison means provides said output signal; and means coupled to said *n*-sources to generate said first code combinaion.

7. Equipment according to claim 1, wherein said first means include an *n*-digit coder coupled to said source having *n* output conductors to provide said *n*-digit code combination representing the value of said analog quantity;

each of said output conductors providing one digit of said *n*-digit code combination;

said output conductors being disposed in accordance to the binary weight of the digit carried thereby from the highest binary weighted digit to the lowest binary weighted digit;

a shift register having *n* stages, each of said stages being coupled to the appropriate one of said conductors for storing therein the appropriate binary weighted digit carried by said conductors;

third means coupled to said register to sequentially shift each of the digits stored in said register from a lower binary weighted stage to a higher binary weighted stage;

fourth means coupled to the highest binary weighted stage of said register responsive to the first "1" digit, the most significant of said *m*-most significant digits, present therein to stop said first shift of the digits stored in said register;

fifth means coupled to the next *m*-1 lower binary weighted stages of said register to provide said first code combinations; and sixth means coupled to selected ones of said output conductors to produce said second code combination.

8. Equipment according to claim 7, wherein said sixth means is coupled to said output conductors carrying the *n*-(*m*-1) highest weighted digits of said *n*-digit code combination.

9. Equipment according to claim 8, wherein said sixth means includes a plurality of impedances, each impedance being coupled to a different one of said *n*-(*m*-1) output conductors and weighted to correspond to the binary weighted digit carried by its associated one of said *n*-(*m*-1) output conductors;

seventh means coupled in common to said impedances to produce a signal proportional to the weighted value of the highest one of said *n*-(*m*-1) output conductors carrying a digit in the "1" condition; and a second coder coupled to said seventh means to produce said second code combination.

10. Coding equipment for use in a P.C.M. system of communication in which a sample of a signal wave is quantized into one of a number of levels each of which can be represented by a code combination in a binary code, including means for generating a plurality of constant weighting voltages of different values, each voltage having a value equivalent to a value represented by one of the digits of the binary code, comparator means to which the signal sample is applied together with each of the weighting voltages in turn, commencing with the voltage having the highest value, counting means for counting the number of successive comparisons between the sample and the voltages until the sample is found to exceed one of the weighting voltages, coding means arranged to produce a binary code combination representing the count reached by the counting means, and pulse generating means arranged to produce binary digit pulses representing the result of a predetermined number of succeeding comparisons between the sample and the weighting voltage after the initial comparison in which the sample is found to exceed a weighting voltage, the binary code representing the count and the binary digits representing the succeeding comparisons together forming an $x$-digit binary code combination.

11. Coding equipment according to claim 10, including rectifying means arranged to rectify the signal sample before the latter is applied to the comparison means.

12. Coding equipment according to claim 10, including means for determining the polarity of the signal sample and means for generating a binary digit pulse representing the signal sample polarity, said binary digit pulse being in addition to the $x$-digit code combination.

References Cited by the Examiner

UNITED STATES PATENTS

| | | | |
|---|---|---|---|
| 2,881,418 | 3/1959 | Stephens et al. | 340—347 |
| 3,194,951 | 7/1965 | Schaefer | 235—154 |

MAYNARD R. WILBUR, *Primary Examiner.*

A. L. NEWMAN, *Assistant Examiner.*